Aug. 15, 1967     T. E. LYNCH     3,335,757
REINFORCED COMPOSITE WALL TUBE
Filed July 10, 1964
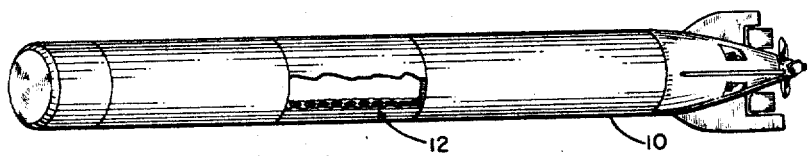
FIG. I
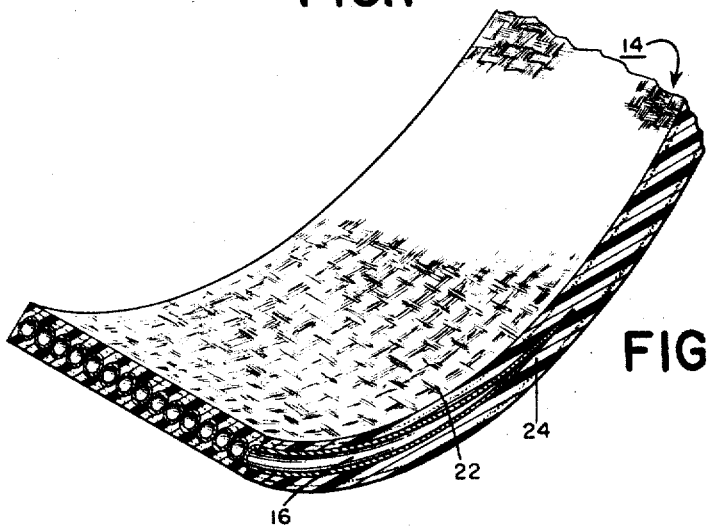
FIG. 2
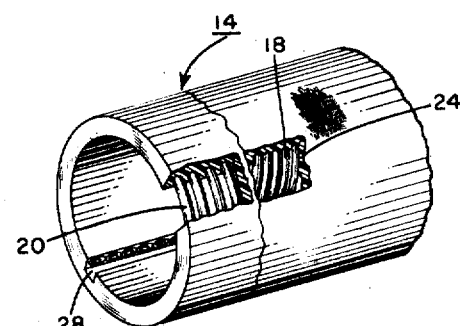
FIG. 3
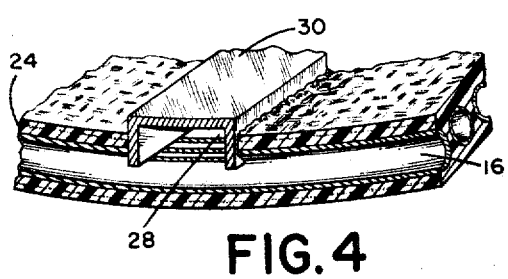
FIG. 4
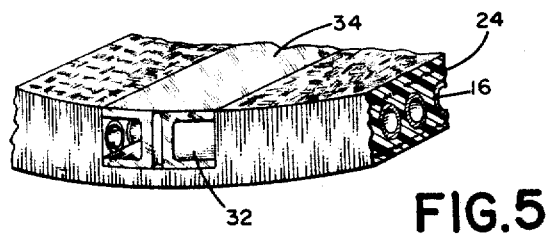
FIG. 5
INVENTOR.
THOMAS E. LYNCH
BY
ATTORNEY United States Patent Office 3,335,757
Patented Aug. 15, 1967

3,335,757
REINFORCED COMPOSITE WALL TUBE
Thomas E. Lynch, Gates Mills, Ohio, assignor to Clevite Corporation, a corporation of Ohio
Filed July 10, 1964, Ser. No. 381,777
6 Claims. (Cl. 138—111)

The invention relates generally to structural materials and more particularly to a fiber reinforced composite structure in tubular form.

Fiber, particularly glass fibers, reinforced structures have received increasing attention and application in recent times. However, their utility in external pressure application has been severely hampered as a result of their relatively low elastic modulus and compressive strength. Although glass fibers reinforcement provides excellent tensile strength, this quality is difficult to use advantageously in deep submergence vehicles. Metals, on the other hand, have the desired characteristics of stiffness and rigidity but fall considerably short of the ideal from a weight and corrosion standpoint. The invention disclosed herein combines the preferred characteristics of fibers, such as glass fibers and metals.

The invention is particularly adapted to be employed in a torpedo hull, although its use is not restricted thereto. The use of this invention in hulls for torpedoes has numerous advantages because it combines various desirable properties; viz., high compressive strength and corrosion resistance, rigidity, deep submergence capability, light weight, buoyancy as well as the capability to have the core of the wall thereof serve as a fluid storage unit, pressure chamber, heat exchanger or component of an electrical system. These characteristics enable the construction of a torpedo which is superior to any known device of this type.

It is therefore the primary object of this invention to provide a new structural material adapted to be fabricated into a torpedo tube to improve the various structural characteristics thereof.

It is a further object of this invention to provide a torpedo hull, constructed in accordance with this invention, in which the walls thereof can be utilized to store fuel, perform the function of a heat exchanger, or be pressurized.

It is a still further object of this invention to provide a torpedo hull in which the walls are pressurized and the pressure is automatically varied to adapt the torpedo to changing pressure conditions resulting from increased or decreased water depth.

An aspect of the present invention resides in the provision of a structural member, for instance in the form of a torpedo tube, in which tubular meanst forms a substantially rigid and hollow cylinder. A layer of fibrous reinforcement material surrounds both the outer and inner cylindrical surface of the cylinder. A layer of resinous material is centrifugally cast upon and encapsulates the mats of the fibrous reinforcement material so that the cylinder forms one rigid and unitary member.

For a better understanding of the present invention, together with other and further objects thereof, reference is had to the following description taken in connection with the accompanying drawings, and its scope will be pointed out in the appended claims.

FIGURE 1 is a diagrammatic view of a torpedo, shown partly fragmentary to illustrate the application of this invention;

FIGURE 2 is a perspective view of a section of a hollow cylinder constructed in accordance with this invention;

FIGURE 3 is a perspective view of a hollow cylinder constructed with parts of the wall broken away to illustrate two ways of arranging internal tubing;

FIGURE 4 is a sectional view taken along the transverse axis of the cylinder shown in FIGURE 3 illustrating a passageway between the tubing; and FIGURE 5 is a view similar to FIGURE 4 showing a modification thereof.

Referring now to the drawing, there is shown in FIGURE 1 a torpedo 10 having a hull constructed in accordance with this invention as illustrated at 12.

The invention is shown in greater detail in FIGURES 2 and 3, and relates to a hollow cylinder 14 comprising a metallic core material 16 in the form of a row of coaxially arranged tubing. The tubing 16 may be either continuous or discontinuous. In the preferred embodiment the core is formed of a continuous helix 18 of aluminum tubing. Alternatively, the tubing may be composed of single and independent tubular rings arranged circumferentially and stacked together as shown at 20, or the tubing may be arranged longitudinally or combinations of both. In order to accomplish the objectives of this invention it is preferable that the core material be hollow. However, the tubing need not be of circular cross-section and may indeed be square, triangular, elliptical etc. Hence the term "tubular means" is used herein in this context and encompasses these structural variations.

The cylindrical body as formed by the metallic core material 16 is covered at its outer and inner cylindrical surface with a layer of fibrous reinforcement material 22. For underwater purposes the factor of weight must be given considerable consideration and therefore a reinforcement material of woven glass fibers or glass fiber-like material has been found to be very satisfactory although a layer of discrete or woven metal fibers can be used. The fiber strands are preferably oriented circumferentially as well as longitudinally and they are interwoven in the two directions as shown in FIGURE 2. While test results have shown that mats of oriented, wrapped, woven or wound fiber material appear to give increased strength, mats of unoriented and/or solid fiber material are also suitable in many instances.

In order to form a solid and unitary body, the cylinder formed of core material 16 and surrounded by fiber mats 22 are encapsulated in a layer of resinous material 24. The resinous material is applied to the face of the cylindrical body by means of the known, conventional, centrifugal casting method. Basically, the cylinder is rotated at a fairly high speed to obtain a centrifugal effect and at the same time the resin 24 is introduced to the interior of the cylinder in liquid form and is spread uniformly around the inside and outside wall of the cylinder. The centrifugal force compacts the reinforcement fibers and causes the resin to displace all air from the structure to produce a dense and thoroughly void free composite. This centrifugal casting method also has the advantage of distributing the resinous material evenly and concentrically around the shell formed by core material 16 and fiber mat 22 so that in the finite form the layer of resinous material is of fairly uniform gage throughout the length of the tube. The resinous material thus in effect forms a matrix in which the core material 16 and the layer of fibers are embedded.

It will thus be appreciated that the core 16 contributes substantially to the structural efficiency of the device by distributing loads and stabilizing the outer layers, particularly since the core itself carries relatively light loads.

Referring now to FIGURE 4 the invention is modified in that the tubing or hollow core material 16 of the cylinder 14 is filled with a fluid medium for a variety of purposes. As modified, it is desirable to provide a seal plug in the ends of the tubing (not shown). In the event that the tubing is used for instance for storing fuel it may be desirable to empty this storage vessel at a rate much faster than the cross area of the tubing would permit. Therefore, there is provided a longitudinally extending slot 28 for accommodating a cross-pipe connection. As is shown in FIGURE 4, the slot is milled into the core material or tubing 16 to a depth approximating the centerline thereof. This preserves the hoop strength of the core material. The slot 28 thus formed is adapted to receive a channel member 30 to provide a continuous fluid passageway transversely across all coils of tubing and additionally providing a continuous bearing for the tubes to conserve hoop strength and enabling an increase in bending strength.

It will therefore be appreciated that the milled slot 28 in conjunction with member 30 constitutes a channel for tying the tubes together so that they can be used more readily for storing and rapidly discharging fluids. Such fluids may be sea water which would pressurize the core material automatically corresponding with the depth of the cylinder in the water. The tubing may also be used to carry a gas to pressurize the device to a predetermined level. Finally, the tubing may be pressurized with a heat transfer fluid, such as Freon (tetrafluoromethane) and the device when disposed in water would serve as a heat exchanger and would cause the Freon to be pressurized to a predetermined level.

The FIGURE 5 discloses another modification of the invention discussed in conjunction with the illustration of FIGURE 4. Herein, a slot 32 is milled into the cylinder structure to a point leading up to or beyond the diameter of the tubing 16 thus interrupting each individual coil. Into this slot there is disposed an I-beam-like member 34 which is substantially flush with respect to the inside diameter and surface of the cylinder. This embodiment is preferred in situations where fluid must be discharged at an extremely rapid rate.

The channel member 30 and the I-beam-like member 34 may, particuliarly in torpedo applications, be used as a structural support to fasten thereto various devices. Internal or external connections can be made by drilling into or through the layers of the aforedescribed materials.

While there have been described what are at present considered to be the preferred embodiments of this invention, it will be obvious to those skilled in the are that various changes and modifications may be made therein without departing from the invention, and it is aimed, therefore, in the appended claims to cover all such changes and modifications as fall within the true spirit and scope of the invention.

What is claimed is:

1. A structural member, comprising: a substantially rigid and hollow cylinder formed of a contiguously disposed row of one or more coils of tubular members; a layer of fibrous reinforcement material surrounding the outer and inner surface of said cylinder; and a matrix of resinous material embedding said layer of fibrous reinforcement material and said cylinder to form a unitary solid and rigid member.

2. A structural member, comprising: a cylinder formed of helically wound coils of tubing having a circular cross-section each coil being contiguous to the adjacent coil to provide an axially rigid body; a layer of fibrous reinforcement material surrounding the outer and inner surface of said cylinder; and a matrix of resinous material embedding said layer of fibrous reinforcement and said rigid cylinder to form a unitary solid and rigid member.

3. An article according to claim 1, wherein said cylinder is composed of a plurality of tubular rings coaxially stacked together.

4. A structural member according to claim 1, wherein said layers of fibrous reinforcement material are composed of a woven mat of glass fibers.

5. A structural member according to claim 1, wherein said cylinder and morer particularly said tubular members thereof are provided with a longitudinally extending slot extending parallel to the central axis of said cylinder, and a continuous conduit within said slot to provide a fluid passageway.

6. A structural member according to claim 5, wherein the outer surface of said conduit is flush with the inner surface of said cylinder.

References Cited
UNITED STATES PATENTS

| | | | |
|---|---|---|---|
| 2,466,676 | 4/1949 | Boling et al. | 165—169 X |
| 2,674,297 | 4/1954 | Greenwald. | |
| 2,783,173 | 2/1957 | Walker et al. | 138—145 X |
| 3,013,584 | 12/1961 | Reed et al. | 138—145 |
| 3,047,026 | 7/1962 | Kahn | 138—124 X |
| 3,099,909 | 8/1963 | Newcomb | 165—169 X |
| 3,177,902 | 4/1965 | Rubenstein | 138—145 X |

FOREIGN PATENTS

| | | |
|---|---|---|
| 1,246,917 | 10/1960 | France. |

LAVERNE D. GEIGER, *Primary Examiner.*

C. L. HOUCK, *Assistant Examiner.*